US010120916B2

(12) United States Patent
Faruquie et al.

(10) Patent No.: US 10,120,916 B2
(45) Date of Patent: Nov. 6, 2018

(54) IN-QUERYING DATA CLEANSING WITH SEMANTIC STANDARDIZATION

(75) Inventors: Tanveer A. Faruquie, New Delhi (IN); Mukesh K. Mohania, New Delhi (IN); L. Venkata Subramaniam, Gurgaon (IN); Charles D. Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/493,945

(22) Filed: Jun. 11, 2012

(65) Prior Publication Data

US 2013/0332407 A1    Dec. 12, 2013

(51) Int. Cl.
G06F 17/30    (2006.01)

(52) U.S. Cl.
CPC .. *G06F 17/30563* (2013.01); *G06F 17/30303* (2013.01)

(58) Field of Classification Search
USPC .......................................................... 707/692
See application file for complete search history.

(56) References Cited

U.S. PATENT DOCUMENTS

| | | | | |
|---|---|---|---|---|
| 6,047,299 | A * | 4/2000 | Kaijima | ........................ 715/236 |
| 7,299,216 | B1 | 11/2007 | Liang et al. | |
| 7,353,387 | B2 | 4/2008 | Benfield et al. | |
| 7,792,783 | B2 * | 9/2010 | Friedlander | ........... G06F 19/322 702/20 |
| 7,996,403 | B2 | 8/2011 | Khasin et al. | |
| 8,015,176 | B2 | 9/2011 | Colby et al. | |
| 2002/0184255 | A1 * | 12/2002 | Edd et al. | ...................... 707/500 |
| 2004/0249644 | A1 | 12/2004 | Schiefer et al. | |
| 2005/0288920 | A1 * | 12/2005 | Green et al. | ...................... 704/3 |
| 2006/0149767 | A1 * | 7/2006 | Kindsvogel et al. | ......... 707/101 |
| 2006/0238919 | A1 | 10/2006 | Bradley | |
| 2008/0120286 | A1 | 5/2008 | Dettinger et al. | |
| 2008/0177719 | A1 | 7/2008 | Dettinger et al. | |
| 2008/0222123 | A1 * | 9/2008 | Colby et al. | ...................... 707/4 |
| 2008/0249998 | A1 * | 10/2008 | Dettinger | .......... G06F 17/30401 |
| 2008/0306913 | A1 * | 12/2008 | Newman et al. | ................. 707/3 |

(Continued)

OTHER PUBLICATIONS

Jun Rao, et al., "A Deferred Cleansing Method for RFID Data Analytics," Proceeding VLDB '06 Proceedings of teh 32nd international conference on Very large data bases VLDB Endowment, 2006.

(Continued)

*Primary Examiner* — Charles D Adams
(74) *Attorney, Agent, or Firm* — Janaki K. Davda; Konrad, Raynes, Davda & Victor LLP

(57) ABSTRACT

The present invention relates to data cleansing, and in particular performing the semantic standardization process within a database before the transform portion of the extract-transform-load (ETL) process. Provided are a method, system and computer program product for standardizing data within a database engine, configuring the standardization function to determine at least one standardized value for at least one data value by applying the standardization table in a context of at least one data value, receiving a database query identifying the standardization function, at least one database value and the context of the data, and invoking the standardization function.

18 Claims, 6 Drawing Sheets

(56) References Cited

U.S. PATENT DOCUMENTS

2009/0063546 A1* 3/2009 Sullivan et al. ............. 707/102
2010/0257145 A1 10/2010 Felsheim
2011/0010401 A1* 1/2011 Adams ............. G06F 17/30315
                                                        707/805
2012/0191642 A1* 7/2012 George ........................ 707/602
2013/0332408 A1 12/2013 Faruquie et al.

OTHER PUBLICATIONS

Fivien Nur Savitri, Hira Laksmiwati, Study of Localized Data Cleansing Process for ETL Performance Improvement in Independent Datamart, 2011 International Conference on Electrical Engineering and Informatics Jul. 17-19, 2011, Bandung, Indonesia.

Helena Galhardas, et al., "AJAX: an extensible data cleaning tool," SIGMOD '00 Proceedings of the 2000 ACM SIGMOD international conference on Management of data, vol. 29 Issue 2, Jun. 2000, p. 590.

Tova Milo, Sagit Zohar, "Using Schema Matching to Simplify Heterogeneous Data Translation," VLDB '98 Proceedings of the 24rd International Conference on Very Large Data Bases, 1988, pp. 122-133.

Office Action 1, dated Mar. 27, 2014, for U.S. Appl. No. 13/956,024, filed on Jul. 31, 2013 by T.A. Faruquie et al., Total 20 pp.

\* cited by examiner

300

| STANDARDIZED | VARIATIONS | CONTEXT | |
|---|---|---|---|
| California 320 | CA, Calif, Cal., Calif. 324 | POSTAL ADDRESS 326 | 308 |
| Drive 330 | DR., DR, Dr. 332 | POSTAL ADDRESS 334 | 310 |
| Doctor 340 | DR., DR, Dr. 342 | NAME 344 | 312 |
| MAHATMA GANDHI 350 | MG, M G, 352 | POSTAL ADDRESS 354 | 314 |
| 0.0254 360 | in., inches 362 | MEASUREMENT: METERS 364 | 316 |

IN-QUERYING DATA CLEANSING WITH SEMANTIC STANDARDIZATION

FIELD OF THE INVENTION

The present invention relates to data cleansing, and in particular performing the semantic standardization process within a database before the transform portion of the extract-transform-load (ETL) process.

BACKGROUND OF THE INVENTION

Business analytics rely on large volumes of data from a variety of sources. A common data repository called a data warehouse is often used to provide a single data source for analysis. The data warehouse is filled with data from the various sources using an extract-transform-load (ETL) process. The extract process retrieves data from one or more source. The transformation process converts the retrieved data to a common schema and performs "data cleansing" to improve the data quality. Finally, the transformed data is loaded into the data warehouse. During the load process, the data quality may be further improved by enforcing uniqueness, referential integrity, and mandatory fields. Similarly, in Master Data Management a single source is used as an authentic information source for disbursing information in enterprise. This source is populated from multiple sources for create single view of entity using an ETL process. The transform process can be used to improve data quality and the load stage may enforce uniqueness, referential integrity, and other mandatory fields.

Analytics performed on the data in the warehouse is only as reliable as the quality of the data; accordingly, "data cleansing" has been an area of intense focus. The data cleansing process is often performed as part of the data transformation process. Data cleansing can correct noisy data, duplicates, and anomalies. Noisy data results from intentional or unintentional changes to some original representation such as: spelling errors, non-standard abbreviations, unknown words, repetitions, overloading information in a single column, or semantic problems such as using the wrong name of city or adding additional information (landmarks). Data duplicates are records that refer to the same entity, but differ by small data inconsistencies. Such duplicates may be caused by noisy data. Other data quality problems may be caused by anomalies so that the data deviates significantly from what is expected; for example, a zipcode that has too many digits. Such data is often handled using a combined analysis of the complete data (e.g. using frequency graphs and histograms) and observing the deviations from expected values. One simple cleaning for anomalous data replaces the anomalous data with NULL.

As businesses demand immediate analytics, the data analyzed must be high quality and fresh. The two requirements are in tension since cleansing to improve quality requires longer ETL processing, but freshness demands shorter ETL processing. The time-consuming process for data cleansing was tolerated when ETL processing was performed in batch mode during off-hours. Fresh data requires frequent ETL processing during the peak periods. Although techniques based on additional, or faster, computer resources may provide reduced cleansing time, solutions with existing computer resources are desired.

SUMMARY OF THE INVENTION

Provided are a method, system and computer program product for standardizing data within a database engine, configuring the standardization function to determine at least one standardized value for at least one data value by applying the standardization table in a context of at least one data value, receiving a database query identifying the standardization function, at least one database value and the context of the data, and invoking the standardization function.

BRIEF DESCRIPTION OF THE DRAWINGS

FIG. 3 illustrates an example standardization table in accordance with certain implementations of the invention.

DETAILED DESCRIPTION OF THE INVENTION

Figure 1:
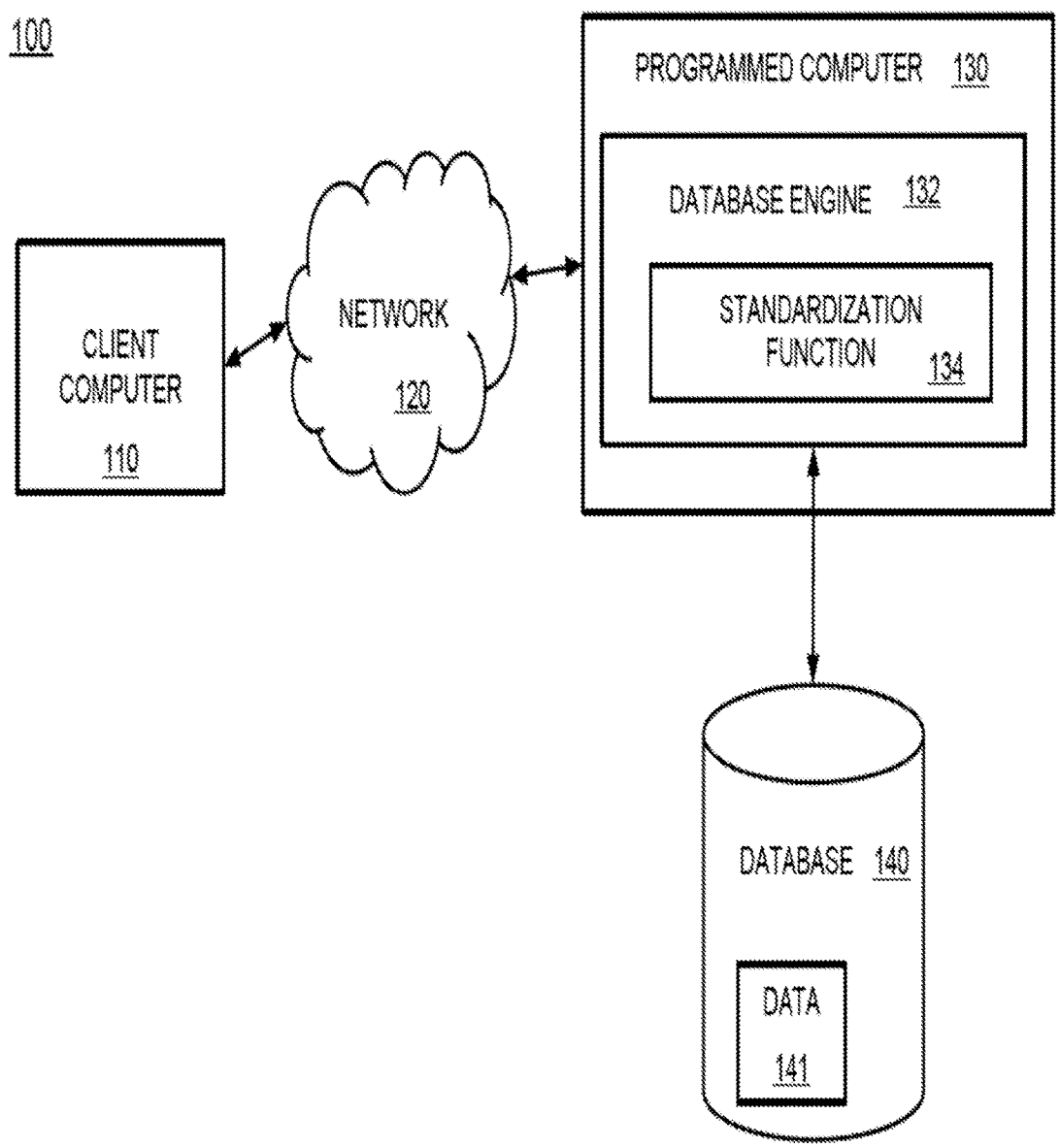
FIG. 1 illustrates, in a block diagram, a computing environment in accordance with certain implementations of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention embodiments are directed towards performing semantic data standardization in the database engine. Data standardization (also sometimes referred to as normalization) is a process for converting data that has more than one possible representation into a consistent form. The multiple possible representations are referred to as "variations." Semantic standardization is data standardization using the context of the data to be standardized.

Reference is now made to FIG. 1, which is a block diagram illustrating system 100 for providing the data standardization service, according to one embodiment of the present invention. As shown, the system 100 includes a client computer 110, a network 120, a programmed computer 130, and a database 140. The computer 110 makes a database query request to the programmed computer 130 using the network 120. The preferred embodiment will be described with reference to the SQL query language, but the present invention applies equally to other data query languages. The network 120 generally represents any kind of data communications network. Accordingly, the network 120 may represent both local and wide area networks. The programmed computer 130 includes a database engine 132. The preferred embodiment will be described with reference to DB2 as the database engine, although the present invention equally applies to other database engines. A database 140 is coupled to the database engine 132. Queries are executed against data 141 of database 140. The standardization function 134 is integrated into the database engine 132 to allow access via query statements executed in the database engine 132. Although one single standardization function is shown in 100, multiple standardization functions may be integrated into the database engine 132. In one embodiment, the standardization function is provided within the database engine 132 and is invoked through an extension to the query language. In another embodiment, the standardization function 134 is provided through user-defined function (UDF). A UDF generally refers to a function, written in a high level language that is defined to the database engine and can be referenced thereafter in database queries. UDFs effectively run as part of the database engine and accordingly provide performance advantages. While the preferred embodiment is discussed in terms of a UDF, other database engines may use a different term to refer to an equivalent feature.

Figure 2:
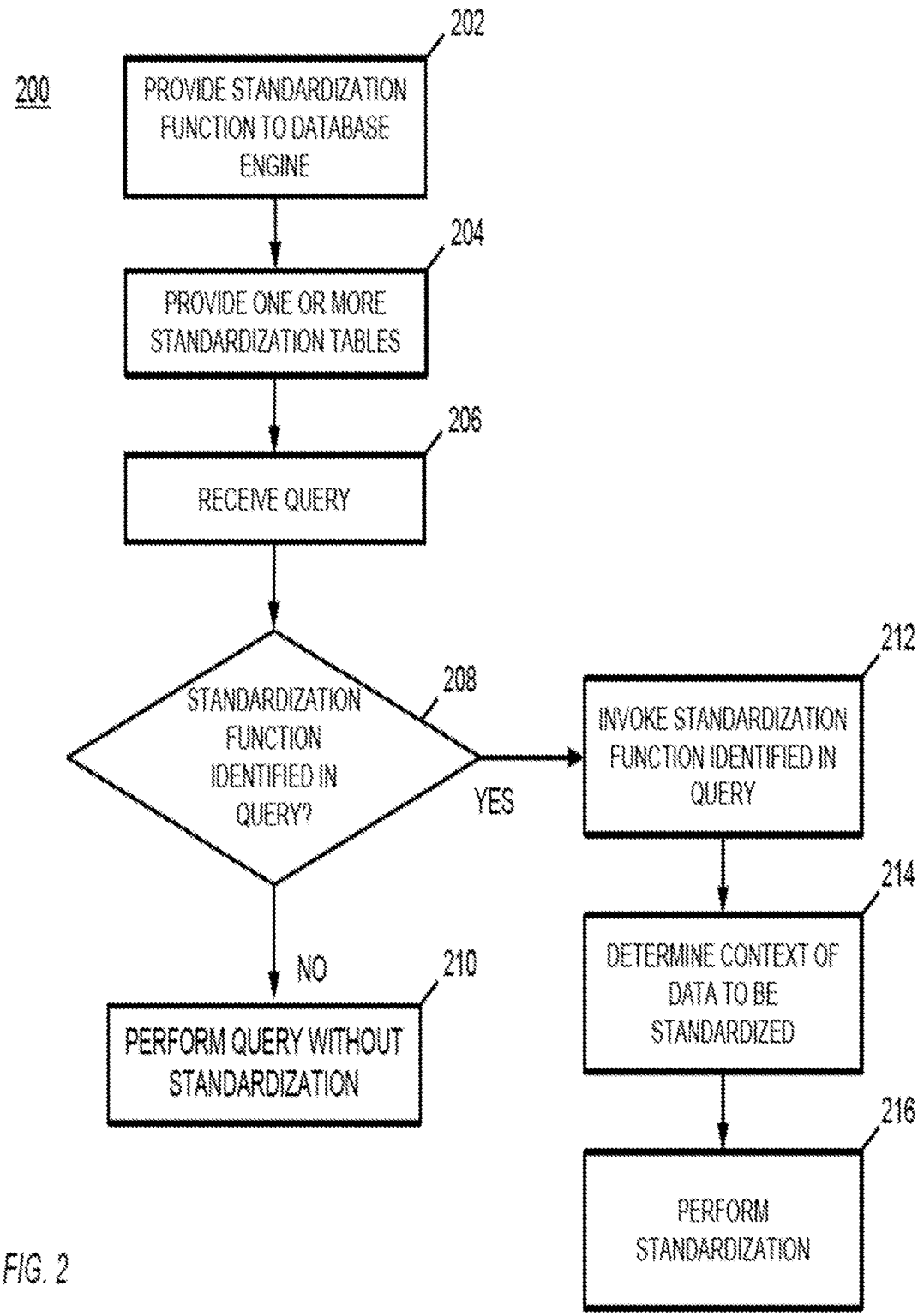
FIG. 2 is a flowchart that illustrates a process, in an embodiment of the invention, performing a standardization function identified in a query.

FIG. 2 illustrates an implementation of a method 200 for standardizing data in a database. At step 202, a standardization function 134 is provided to the database engine 132. In step, 204 one or more standardization tables are provided that can be accessed by the standardization function 134. Standardization tables facilitate the process of standardization and explained in greater detail below. At step 206, the database engine 132 receives a query. Step 208 determines whether a standardization function is identified in the query. If step 208 determines a standardization function is not identified in the query then step 210 performs the query without standardization. If step 208 determines a standardization function is identified in the query then step 212 invokes the standardization function identified in the query. The context of the data is determined in step 214. In one embodiment, the context is provided by a parameter passed to the standardization function along with data. In another embodiment, the standardization function called is exclusive to a particular context. For example, a standardization function named STANDARIZE_POSTAL_ADDRESS will apply the context POSTAL_ADDRESS to any data provided. In another embodiment, the standardization function applies metadata, such as the column name and database schema, to determine the context of the data. The standardization function performs the standardization in step 216 using, in one embodiment, the data provided in the query, the one or more standardization tables, and the context.

FIG. 3 illustrates an example standardization table in the form of a database table 300 according to one embodiment of the invention. The database table 300 includes three columns 302, 304 and 306 corresponding to columns—STANDARDIZED, VARIATIONS and CONTEXT. Entries in the standardized column 302 generally reflect the standard value to be returned by the standardization function 134 for a variation found in column 304 in context 306. Table 300 further includes five data records in rows 308, 310, 312, 314, and 316. Record 308 represents the variations 324 of the standard form of California 320 in context of POSTAL ADDRESS 326. When a certain embodiment of the standardization function 134 is provided with one of the variations 324, for example CA, in the context of POSTAL ADDRESS 326 the corresponding standardized value "California" 320 is returned. Record 310 represents variations 332 of the standard form of "Drive" 330 in context of POSTAL ADDRESS 334. The textual data "Dr." is one of the variations 332 corresponding and when a certain embodiment of the standardization function 134 is provided with "Dr." 332 in the context of POSTAL ADDRESS 334 the word "Drive" is returned. Record 312 represents variations 342 that are identical to those found in 332, however variations 342 are in context of NAME 344 and correspond to a standardized value "Doctor" 340. The difference between records 310 and 312 illustrates how context affects the standardization of a word. Record 314 provides an example of variations that may affect the name of a street. Variations 352, MG and M G are short hand representations of MAHATMA GANDI 350, when used in the context of POSTAL ADDRESS 354.

According to one embodiment, the standardization table may be used by the standardization function to standardize measurements. Record 316 provides one example illustrating a conversion of inches to meters. A variation of "in." 342 together with a context of "MEASURE: METERS" 343 is interpreted by an embodiment of the standardization function 134 to convert "in" to "METERS" and use convert the numeric value using the STANDARDIZED 360 value 0.0254. that the standardization column contains a factor for converting from "in." to "METERS" and further the user defined function will provide the conversion for numeric values and provide the standard "METER" for the text value.

In one embodiment, multiple standardization tables are applied by the standardization function 134 to standardize one or more data values. In one embodiment multiple standardization tables, each corresponding to a context, are provided; accordingly, such standardization tables do not require a context column since all information in the table would correspond to a particular context. In another embodiment, multiple standardization tables are provided with context columns, as well as other columns that may or may not be used by the standardization function. Although the embodiments described represent a standardization table as a database table, other embodiments may represent the standardization table as a data structure.

Figure 4:
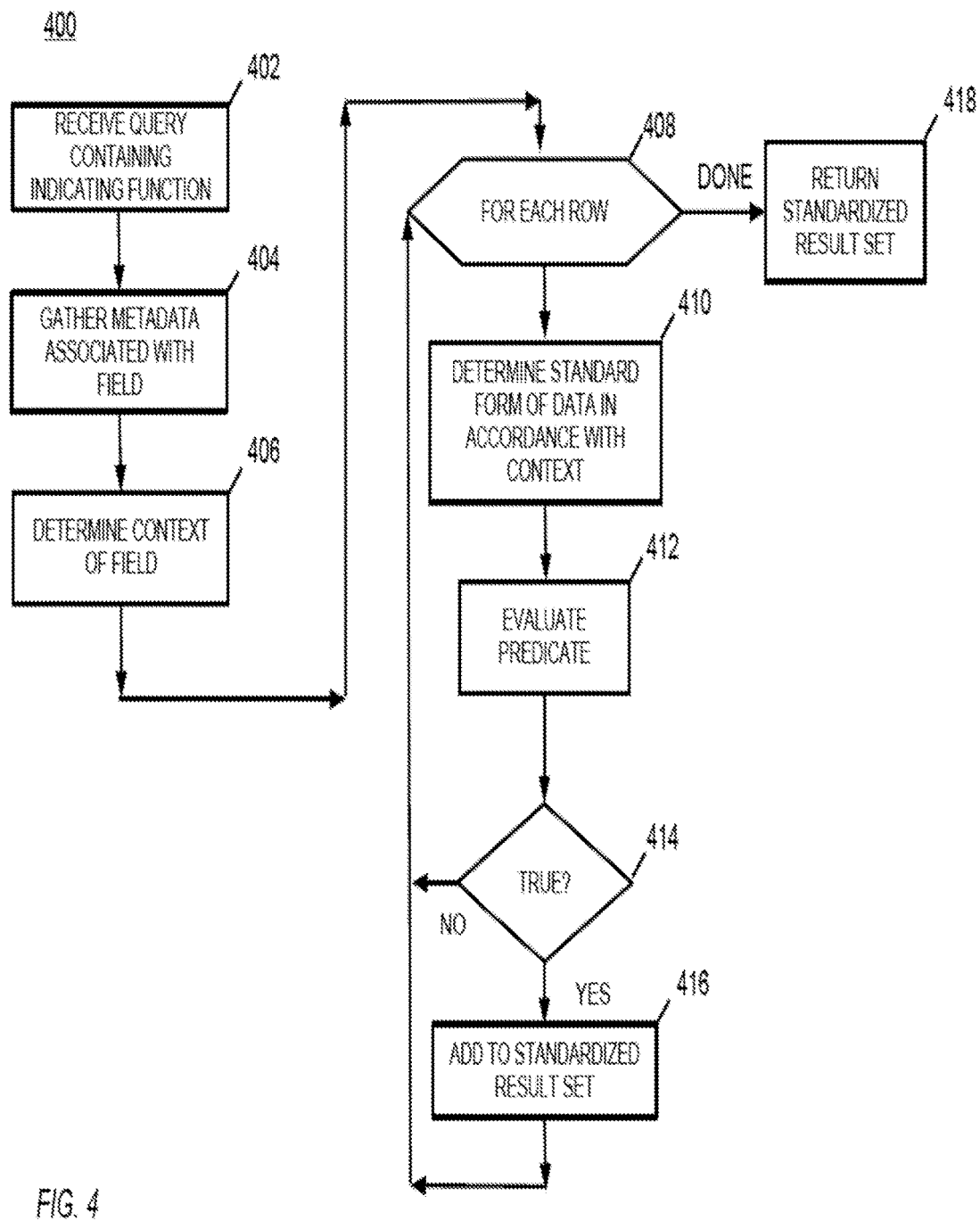
FIG. 4 illustrates an implementation of a method in which standardization is performed on multiple data values using a User Defined Function (UDF).

FIG. 4 illustrates an implementation of a method 400 in which standardization is performed on multiple data values using a User Defined Function (UDF). A query to the database is received at step 402. An example of the query would be:

SELECT TABLE.address WHERE STANDARDIZE_UDF(TABLE.address='M G Road').

In this example, the data to be standardized is contained in the field TABLE.address. Metadata, data describing the field data, is gathered in step 404. In one embodiment, the metadata is the column name for the field, in this example the column name is address. Step 406 determines the context of the field using the metadata. In one embodiment, the context is the same as the metadata. In another embodiment, the context may be found through a look-up table relating metadata to context. In another embodiment, the UDF may be context dependent. Step 408 loops through all the rows that are evaluated by the UDF. The field data for each considered row is transformed to standard form in step 410. In one embodiment, a query is performed against the standardization table 300 to match the data to the VARIATION column 304 and CONTEXT 306 to determine the standard value. The standardized value is evaluated with the predicate in step 412 and evaluated in step 414. If the predicate results in TRUE the standardized data is added to a standard result set in step 416. Data that does not result in a TRUE predicate are not added to the result set and the loop continues to the next row in step 408. When all rows have been processed, looping step 408 is complete and the standardized result set is returned in step 418.

In another embodiment, the UDF, or another user-defined function, may be invoked to store the standardized result back into the database. In one embodiment, the standardization function may determine the context to be a range of numbers. The value is converted, if necessary, to a standard unit such as meters, and is then compared to the range, which would be in standard values. If the value is within the specified range, the value converted into the standard units is returned. If the value is not within the out of range condition is identified through an output device to indicate and out of range condition. The standardization function may be configured to return the original value or some other value.

Figure 5:
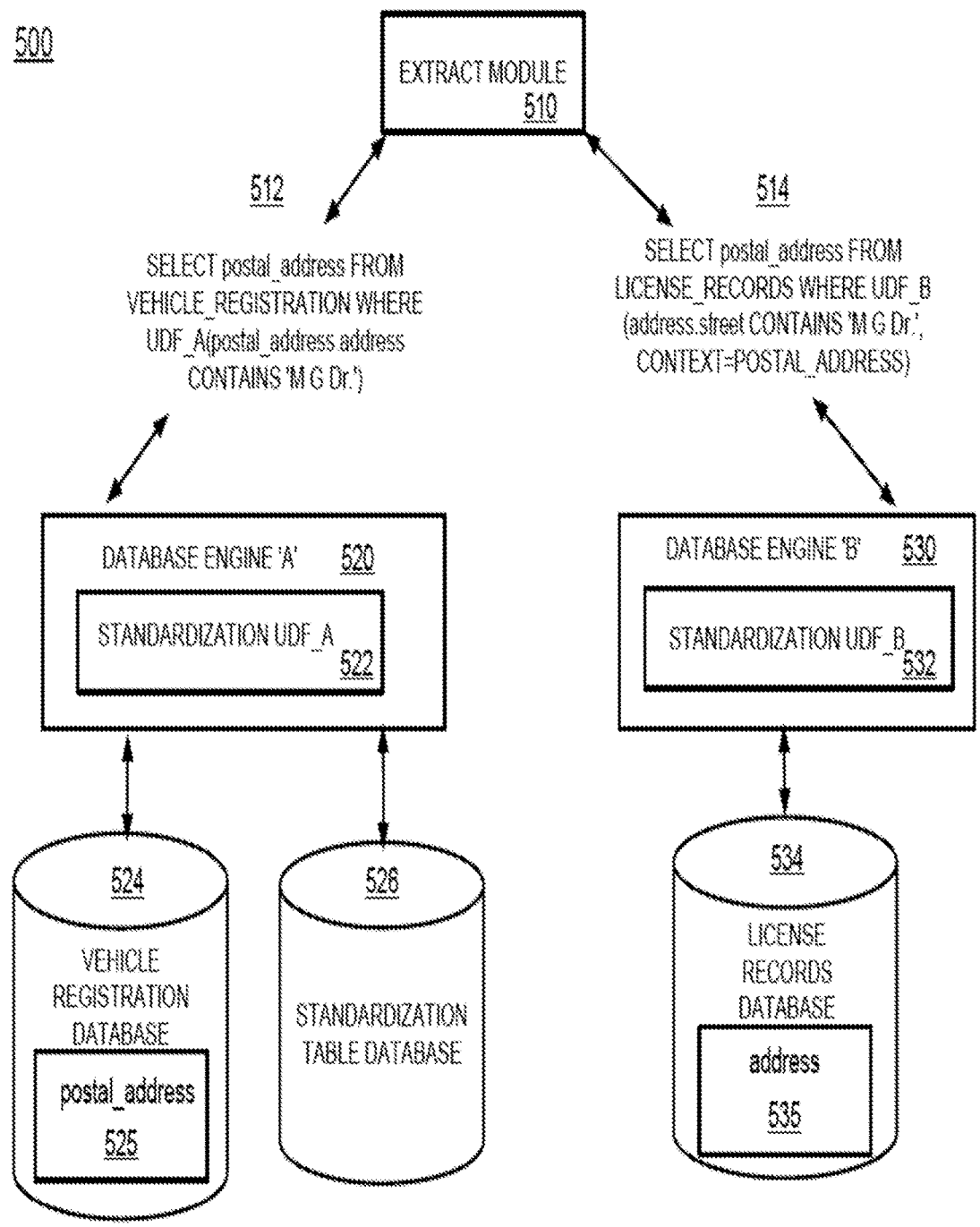
FIG. 5 illustrates, in a block diagram, a computing environment with multiple database engines in accordance with certain implementations of the invention.

FIG. 5. Illustrates a block diagram 500 of an implementation illustrating the standardization service according to an embodiment of the invention wherein an extract module 510 generates a query to two separate database engines, database engine 'A' 520, and database engine 'B' 530. The extract module 510 may reside in any programmed computer 130 using network 120 and does not require a database engine 132. Each database engine (520 and 530) has a separate UDF function for standardization. In one embodiment both databases engines contain both standardization functions. Standardization UDF_A 522, is within database engine 'A' 520, and standardization UDF_B 532 is within database engine T 530. Database engine 'A' is coupled to a vehicle registration database 524, and standardization table database 526. In one embodiment, table database 526 contains table 300. The vehicle registration database 524 contains records corresponding to vehicle registrations. The vehicle registration database contains postal_address table 525. The standardization table database 526 contains tables to support the standardization function for UDF_A 522. Database engine 'B' 530 is coupled to a license records database 534 containing an address table 535.

Extract module 510 generates a database query 512 to retrieve all records in table postal_address 525 where the column 'address' contains any variation of "M_G_Dr." using UDF_A. Database engine 'A' 520 receives query 512, determines that UDF_A 522 is within database engine 'A' 520, and invokes UDF_A 522. In one embodiment, UDF_A 522 determines the context using the table and column information and uses table 300 to determine the standard value 302 from input data using variations 304 and context 306. UDF_A parses "M G Dr." to "M G" and "Dr." determines context to be POSTAL ADDRESS, and using table 300 determines the standardization value to be "MAHATMA GANDI Drive." The standardization value for each address stored in postal_address. address is similarly determined. Those standardized values corresponding to "MAHATMA GANDI Drive" are returned.

Extract module 510 generates a database query 514 to retrieve all records in table address 535 where the column 'street' contains any variation of "M G Dr." using UDF_B 532. Database engine 'B' 530 receives query 514, determines that UDF_B 532 is within database engine 'B' 530 and invokes UDF_B 532. In one embodiment, UDF_B uses the context provided by the parameter passed within query 514, "POSTAL_ADDRESS" together with a data structure provided with UDF_B 532 to determine standardization value. UDF_B 532 parses "M G Dr." to "M G" and "Dr." using the data structure to determine the standardization value to be "MAHATMA GANDI Drive." The standardization value for each address stored in address.street is similarly determined. Those standardized values corresponding to "MAHATMA GANDI Drive" are returned.

Figure 6:
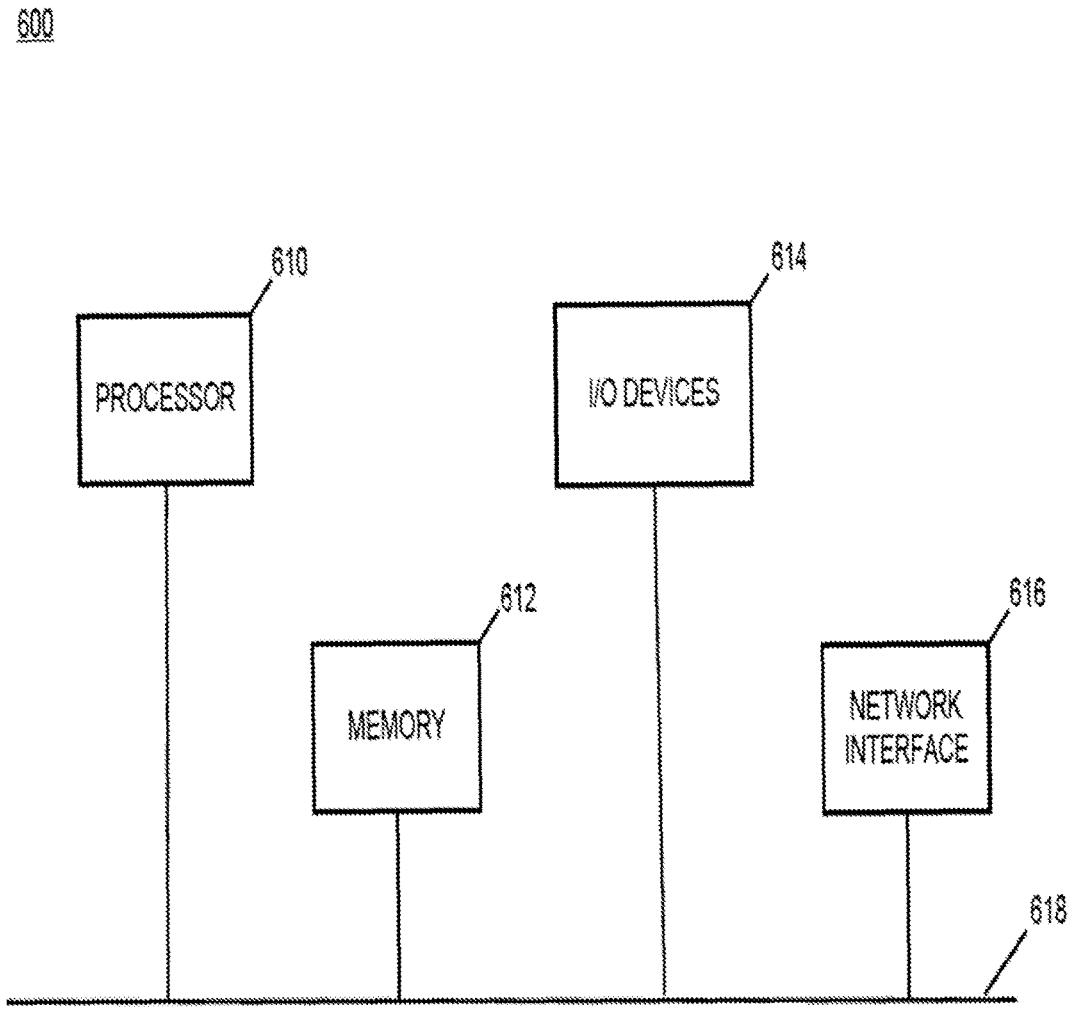
FIG. 6 is a simplified block diagram illustration of an exemplary hardware implementation of a computing system, in accordance with an embodiment of the invention.

Referring now to FIG. 6 block diagram 600 illustrates an exemplary hardware implementation of a computing system in accordance with which one or more components/methodologies of the invention (e.g., components/methodologies described in the context of FIGS. 1-5) may be implemented, according to an embodiment of the invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g. keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer implemented method comprising:
   integrating a set of standardization functions into database engines to allow access to standardization of data via database queries executed in the database engines against databases;
   storing a plurality of standardization tables;
   with an extract module, extracting data before a transform portion of an extract, transform, and load process by issuing a first database query from the database queries to a first database engine of the database engines and a second database query from the database queries to a second database engine of the database engines, wherein the first database query includes a first standardization function, and wherein the second database query includes a second standardization function;
   with the first database engine,
      determining a first context included in the first standardization function; and
      invoking the first standardization function within the first database engine to convert a first data value having the first context using a first standard value and a first standardization table from the plurality of standardization tables that includes a context column for the first context;
   with the second database engine,
      determining a second context using metadata values by:
         identifying the metadata values of a column name and a database schema;
         mapping the metadata values to the second context using a lookup table; and
         identifying a second standardization table from the plurality of standardization tables based on the second context, wherein the second standardization table does not include any context column; and invoking the second standardization function within the second database engine to convert a second data value having the second context using a second standard value and the second standardization table; and providing cleansed data in the databases before another transform portion of another extract, transform, and load process by storing the converted first data value and the converted second data value.

2. The method of claim 1 wherein the first standardization function is a user defined function.

3. The method of claim 2, wherein the user defined function receives the first context of the first data value as a parameter.

4. The method of claim 1, wherein determining the second context further comprises:
accessing the metadata values describing the second data value; and
determining the second context with the metadata values.

5. The method of claim 4, further comprising:
updating a non-standard value with a standardized value.

6. The method of claim 1 wherein the first standardization table contains information for performing measurement conversion.

7. A system comprising: a processor; and a memory containing program code which when executed by the processor is configured to perform an operation, comprising:
integrating a set of standardization functions into database engines to allow access to standardization of data via database queries executed in the database engines against databases;
storing a plurality of standardization tables;
with an extract module, extracting data before a transform portion of an extract, transform, and load process by issuing a first database query from the database queries to a first database engine of the database engines and a second database query from the database queries to a second database engine of the database engines, wherein the first database query includes a first standardization function, and wherein the second database query includes a second standardization function;
with the first database engine,
determining a first context included in the first standardization function; and
invoking the first standardization function within the first database engine to convert a first data value having the first context using a first standard value and a first standardization table from the plurality of standardization tables that includes a context column for the first context;
with the second database engine,
determining a second context using metadata values by:
identifying the metadata values of a column name and a database schema;
mapping the metadata values to the second context using a lookup table; and
identifying a second standardization table from the plurality of standardization tables based on the second context, wherein the second standardization table does not include any context column; and
invoking the second standardization function within the second database engine to convert a second data value having the second context using a second standard value and the second standardization table; and
providing cleansed data in the databases before another transform portion of another extract, transform, and load process by storing the converted first data value and the converted second data value.

8. The system of claim 7, wherein the first standardization function is a user defined function.

9. The system of claim 8, wherein the user defined function receives the first context of the first data value as a parameter.

10. The system of claim 7, wherein determining the second context further comprises:
accessing the metadata values describing the second data value; and
determining the second context with the metadata values.

11. The system of claim 10, further comprising:
updating a non-standard value with a standardized value.

12. The system of claim 7, wherein the first standardization table contains information for performing measurement conversion.

13. A computer program product comprising a non-transitory computer readable storage medium storing computer readable program code, which when executed by a computer, causes the computer to:
integrate a set of standardization functions into database engines to allow access to standardization of data via database queries executed in the database engines against databases;
store a plurality of standardization tables;
with an extract module, extract data before a transform portion of an extract, transform, and load process by issuing a first database query from the database queries to a first database engine of the database engines and a second database query from the database queries to a second database engine of the database engines, wherein the first database query includes a first standardization function, and wherein the second database query includes a second standardization function;
with the first database engine,
determine a first context included in the first standardization function; and
invoke the first standardization function within the first database engine to convert a first data value having the first context using a first standard value and a first standardization table from the plurality of standardization tables that includes a context column for the first context;
with the second database engine,
determining determine a second context using metadata values by:
identifying the metadata values of a column name and a database schema;
mapping the metadata values to the second context using a lookup table; and
identifying a second standardization table from the plurality of standardization tables based on the second context, wherein the second standardization table does not include any context column; and
invoke the second standardization function within the second database engine to convert a second data value having the second context using a second standard value and the second standardization table; and
provide cleansed data in the databases before another transform portion of another extract, transform, and load process by storing the converted first data value and the converted second data value.

14. The computer program product of claim 13, wherein the first standardization function is a user defined function.

15. The computer program product of claim 14, wherein the user defined function causes the computer to receive the first context of the first data value as a parameter.

16. The computer program product of claim 13, wherein, when determining the second context, the computer readable program code further causes the computer to:
   access the metadata values describing the second data value; and
   determine the second context with the metadata values.

17. The computer program product of claim 16, further causes the computer to:
   update a non-standard value with a standardized value.

18. The computer program product of claim 13, wherein the first standardization table contains information for causing the computer to perform measurement conversion.

* * * * *